(12) United States Patent
Spertus

(10) Patent No.: US 8,732,821 B1
(45) Date of Patent: May 20, 2014

(54) METHOD AND APPARATUS FOR PREVENTING ACCIDENTIAL DISCLOSURE OF CONFIDENTIAL INFORMATION VIA VISUAL REPRESENTATION OBJECTS

(75) Inventor: Michael Spertus, Wilmette, IL (US)

(73) Assignee: Symantec Corporation, Mountain View, CA (US)

( * ) Notice: Subject to any disclaimer, the term of this patent is extended or adjusted under 35 U.S.C. 154(b) by 654 days.

(21) Appl. No.: 12/724,061

(22) Filed: Mar. 15, 2010

(51) Int. Cl.
*G06F 21/00* (2013.01)

(52) U.S. Cl.
USPC ............. 726/19; 713/182; 713/183; 713/184; 713/189

(58) Field of Classification Search
USPC .......................................................... 726/19
See application file for complete search history.

(56) References Cited

U.S. PATENT DOCUMENTS

| | | | |
|---|---|---|---|
| 2002/0070964 A1* | 6/2002 | Botz et al. .................. | 345/741 |
| 2003/0018714 A1* | 1/2003 | Mikhailov et al. ........... | 709/203 |
| 2004/0073802 A1* | 4/2004 | Seol ............................ | 713/183 |
| 2004/0078422 A1* | 4/2004 | Toomey ...................... | 709/202 |
| 2006/0101128 A1* | 5/2006 | Waterson ..................... | 709/212 |
| 2006/0278701 A1* | 12/2006 | Matsushita et al. ........... | 235/382 |
| 2007/0006287 A1* | 1/2007 | Noda ........................... | 726/4 |
| 2007/0168285 A1* | 7/2007 | Girtakovskis et al. ......... | 705/50 |
| 2009/0100184 A1* | 4/2009 | Chakra et al. ................ | 709/229 |
| 2009/0106835 A1* | 4/2009 | Corrao et al. ................. | 726/21 |
| 2009/0177883 A1* | 7/2009 | Wang ........................... | 713/164 |
| 2009/0260077 A1* | 10/2009 | Zhu et al. ..................... | 726/19 |
| 2009/0282036 A1* | 11/2009 | Fedtke .......................... | 707/6 |
| 2010/0024037 A1* | 1/2010 | Grzymala-Busse et al. .... | 726/26 |
| 2010/0218241 A1* | 8/2010 | Faryna .......................... | 726/5 |

OTHER PUBLICATIONS

Hirano et al., T-PIM: Trusted Password Input Method against Data Stealing Malware, Apr. 2009, Sixth International Conference on Information Technology: New Generations, ITNG '09, pp. 429-434.*

"About the security content of J2SE 5.0 Release 4," downloaded from web site http://docs.info.apple.com/article.html?artnum=303658 on Jul. 15, 2008, Copyright © 2008 Apple Inc.

"Security Vulnerabilities in the Java Runtime Environment may Allow an Untrusted Applet to Elevate its Privileges," downloaded from web site http://sunsolve.sun.com/search/document.do?assetkey=1-26-102171-1 on Jul. 15, 2008, Copyright © 2008 Sun Microsystems, Inc., SunSolve Version 7.0.5 (prod build #2).

"Security Vulnerability With Java Web Start," downloaded from web site http://sunsolve.sun.com/search/document.do?assetkey=1-26-102170-1 on Jul. 15, 2008, Copyright © 2008 Sun Microsystems, Inc., SunSolve Version 7.0.5 (prod build #2).

* cited by examiner

*Primary Examiner* — Mohammad L Rahman
*Assistant Examiner* — Kenneth Chang
(74) *Attorney, Agent, or Firm* — Wilmer Cutler Pickering Hale and Dorr LLP

(57) ABSTRACT

A method and apparatus for preventing accidental disclosure of confidential information via visual representation objects is described. In one embodiment, the method includes establishing pattern information with respect to confidential information, wherein the confidential information is used to authenticate users, monitoring a visual representation object having an input focus associated with a user interface, wherein the visual representation object receives input data, comparing the input data with the pattern information to identify at least one unobscured portion of the confidential information and producing indicia of detection of the at least one unobscured portion of the confidential information on the visual representation object.

18 Claims, 7 Drawing Sheets

METHOD AND APPARATUS FOR PREVENTING ACCIDENTIAL DISCLOSURE OF CONFIDENTIAL INFORMATION VIA VISUAL REPRESENTATION OBJECTS

BACKGROUND OF THE INVENTION

1. Field of the Invention

Embodiments of the present invention generally relate to a computer security system and, more particularly, to a method and apparatus for preventing accidental disclosure of confidential information via visual representation objects.

2. Description of the Related Art

Often, when presented with a visual representation object, such as a computer window, a user accidently inputs confidential or sensitive information, such as passwords, social security numbers, bank accounts and the like. For example, the user accidently inputs passwords in a user name field. Such an accidental disclosure of important confidential information (e.g., passwords) presents a security risk for the user. The confidential information is open to public view and can be easily compromised.

As another example, an Instant Message application changes the input focus when a new message arrives while the user is in the middle of accessing a bank account online. Consequently, the user accidently types in a password for the bank account on the instant message window instead of an online form for accessing the back account. If the user does not catch such a mistake before the password is communicated, the bank account is at risk for theft. Malicious software programs that are responsible for input focus stealing also cause the accidental confidential information disclosure.

Generally, controls (i.e., MICROSOFT WINDOWS controls) are visual representation components (i.e., software code) that are defined in a user interface implementation and generated (e.g., instantiated) by the operating system for interacting with the user. Such controls comprise information regarding a format and a layout of a graphical object presented on the computer display. For example, a control may define a visual style for an edit box that receives a password as input from the user. Currently, solutions for preventing and/or remediating disclosure of the confidential information, such as password controls, obscure the inputted data from the public view. For example, the password controls obscure the text and present the computer user with a character string having one or more of a single character. Unfortunately, these solutions do not prevent the confidential information from being accidentally disclosed through other visual representation where the input data is not obscured.

Therefore, there is a need in the art for a method and apparatus for preventing accidental disclosure of confidential information via computer windows.

SUMMARY OF THE INVENTION

Various embodiments of the present invention generally includes a method and apparatus for preventing accidental disclosure of confidential information via visual representation objects. In one embodiment, a method for preventing accidental disclosure of confidential information through visual representation objects includes establishing pattern information with respect to confidential information, wherein the confidential information is used to authenticate users, monitoring a visual representation object having an input focus associated with a user interface, wherein the visual representation object receives input data, comparing the input data with the pattern information to identify at least one unobscured portion of the confidential information and producing indicia of detection of the at least one unobscured portion of the confidential information on the visual representation object.

In some embodiments, unique textual data is determined based on statistical data for the confidential information, wherein the unique textual data comprises various portions of the confidential information. In some embodiments, the pattern information and the input data are transformed into the indicia of detection. In some embodiments, the pattern information is compared with a metric for determining effective character strings for identifying the confidential information. In some embodiments, the identified at least one unobscured portion is compared with a whitelist, wherein the white list comprises approved textual data for the visual representation object.

In some embodiments, communication of the input data to the visual representation object is blocked. In some embodiments, display of characters entered subsequent to the unobscured portions of the confidential information is blocked. In some embodiments, the unobscured portions of the confidential information comprise a password prefix. In some embodiments, communication of the input data to the visual representation object is blocked if the visual representation object comprises a password control. In some embodiments, application software that created the visual representation object is examined with a whitelist.

In another embodiment, an apparatus for preventing accidental disclosure of confidential information via visual representation objects includes an establishment module for generating pattern information with respect to confidential information, wherein the confidential information is used to authenticate users, a monitoring module for accessing a visual representation object having an input focus associated with a user interface, wherein the visual representation object receives input data, a comparison module for examining the input data and the pattern information to identify at least one unobscured portion of the confidential information and a production module for presenting indicia of detection of the at least one unobscured portion of the confidential information on the visual representation object.

In some embodiments, the establishment module determines unique textual data based on statistical data for the confidential information, wherein the unique textual data comprises various portions of the confidential information. In some embodiments, the comparison module compares the identified at least one unobscured portion with a whitelist, wherein the whitelist comprises approved textual data for the visual representation object. In some embodiments, the production module blocks communication of the input data to the visual representation object. In some embodiments, the production module permits communication of the input data if the visual representation object comprises a password control. In some embodiments, the comparison module examines application software that created the visual representation object with a whitelist.

In yet another embodiment, a computer-readable-storage medium comprising one or more processor-executable instructions that, when executed by at least one processor, causes the at least one processor to establish pattern information with respect to confidential information, wherein the confidential information is used to authenticate users, monitor a visual representation object having an input focus associated with a user interface, wherein the visual representation object receives input data, compare the input data with the pattern information to identify at least one unobscured portion of the confidential information and produce indicia of detection of the at least one unobscured portion of the confidential information on the visual representation object.

In some embodiments, the one or more processor-executable instructions, when executed by the at least one processor, causes the at least one processor to block communication of the input data to the visual representation object. In some embodiments, the one or more processor-executable instructions, when executed by the at least one processor, causes the at least one processor to permit communication of the input data if the visual representation object comprises a password control. In some embodiments, the one or more processor-executable instructions, when executed by the at least one processor, causes the at least one processor to examine application software that created the visual representation object with a whitelist.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Various embodiments of the present invention prevent the accidental disclosure of confidential information through a visual representation object. If text inputted by a computer user is about to be presented as clear text, various software modules (e.g., a comparison module) determines whether the inputted text includes the confidential information. As explained further below, if these software modules identify a portion of the confidential information within the inputted text, communication of the inputted text to the visual representation object is blocked. Thus, the inputted text is prevented from being presented to the computer user on a user interface.

Figure 1:
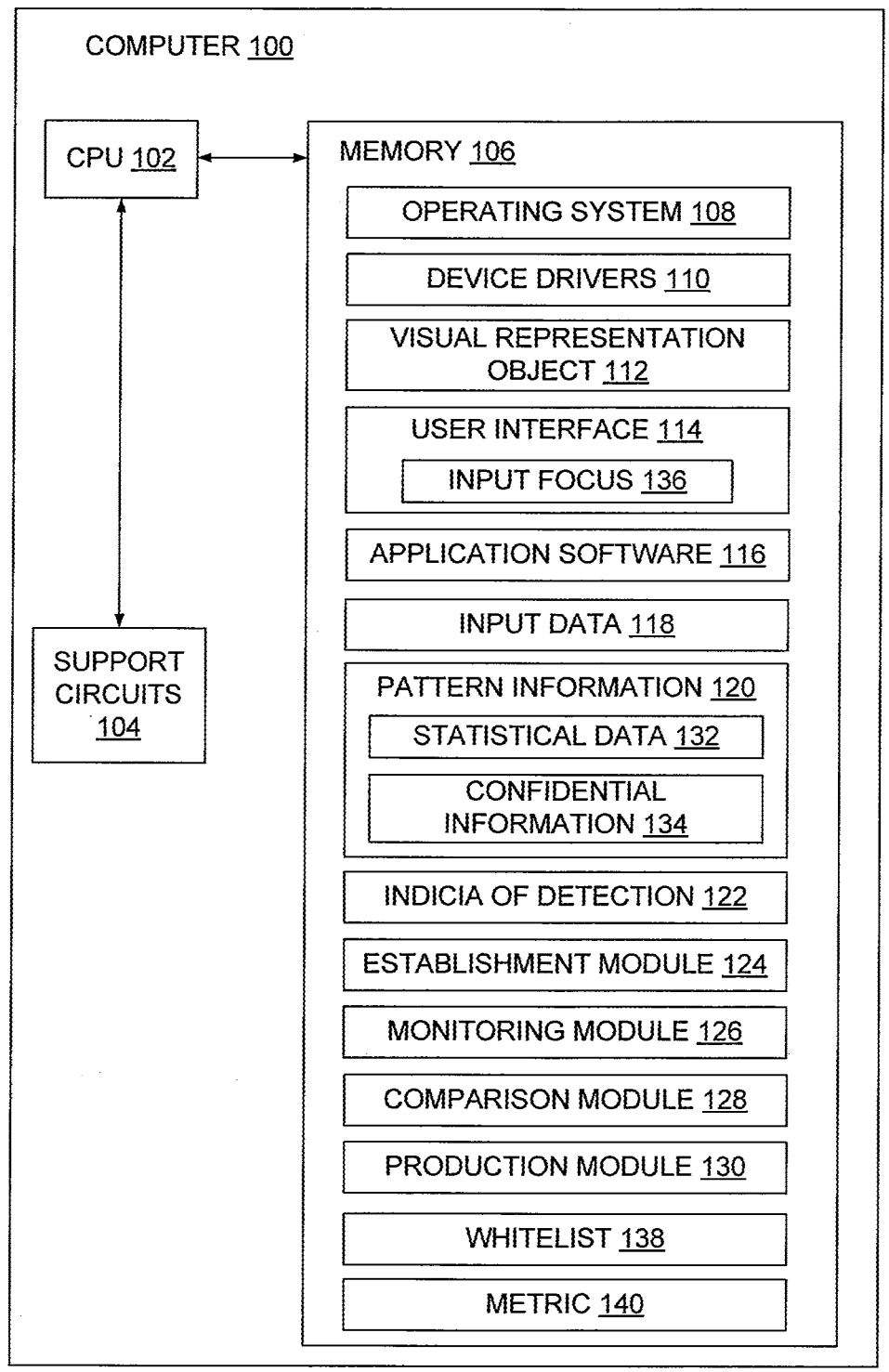
FIG. 1 is a block diagram of a computer for preventing accidental disclosure of confidential information via visual representation objects according to various embodiments of the present disclosure.

FIG. 1 is a block diagram of a computer 100 for preventing accidental disclosure of confidential information 134 via one or more visual representation objects 112 according to various embodiments of the present disclosure.

The computer 100 is a type of computing device (e.g., a laptop, a desktop, a Personal Digital Assistant (PDA) and/or the like) that comprises a Central Processing Unit (CPU) 102, various support circuits 104 and a memory 106. The CPU 102 may comprise one or more commercially available microprocessors or microcontrollers that facilitate data processing and storage. Various support circuits 104 facilitate operation of the CPU 102 and may include clock circuits, buses, power supplies, input/output circuits and/or the like. The memory 106 includes a read only memory, random access memory, disk drive storage, optical storage, removable storage, and the like. The memory 106 includes an operating system 108, device drivers 110 as well as various additional software packages, such as an establishment module 124, a monitoring module 126, a comparison module 128 and a production module 130. The memory 106 includes various data, such as input data 118, pattern information 120, indica of detection 122, a whitelist 138 and/or a metric 140.

The operating system 108 generally manages various computer resources (e.g., network resources, data storage resources, file system resources and/or the like). The operating system 108 is configured to execute operations on one or more hardware and/or software devices, such as Network Interface Cards (NICs), hard disks, virtualization layers, firewalls and/or the like. For example, the various software packages call commands associated with the operating system 108 (i.e., native operating system commands) to perform various file system and/or storage operations, such as creating files or metadata, writing data to the files, reading data from the files, modifying metadata associated with the files and/or the like. The operating system 108 may call one or more functions associated with the device drivers 110 to execute various file system and/or storage operations. As an example, the operating system 108 may utilize a device driver associated with a Network Interface Card (NIC) card to communicate data to another computer as explained further below.

The one or more visual representation objects 112 are user interface 114 components of which application software 116 (e.g., a web browser, a word processing software program, a typing instruction program and/or the like) create to interact with the computer user. The visual representation components 112 may be referred to as computer windows in various embodiments. The operating system 108 also creates computer windows, such as dialog boxes, message boxes, user interface controls and/or the like. The web browser may use the operating system 108 to create computer windows (i.e., browser windows) for presenting rendered web pages to the computer user. The rendered web pages include password controls where obscured inputted data prevents accidental disclosure of the confidential information 134.

Various attributes for the visual representation objects 112 affect functionality and user interaction according to some embodiments. For example, an input focus 136 is an attribute indicating whether input data 118 can be communicated to at least one of the visual representation objects 112. On the user interface 114, the input focus 136 includes with an identifier for a particular visual representation object 112 to which communication of the input data 118 is permitted. In one embodiment, the operating system 308 configures one or more attributes for defining content and appearance of the computer windows. In some embodiments, malicious computers attack the computer 100 by exploiting vulnerabilities and/or manipulating the visual representation objects 112. The visual representation object 112 may be a browser window having images and text that are presented on the user interface 114.

In some embodiments, the pattern information 120 includes textual data configured for preventing the accidental or unwanted disclosure of the confidential information 134. Generally, the confidential information 134 includes various forms of sensitive data, such as passwords, financial records, intellectual property, customer data, medical histories, purchase orders, legal documents, privileged information, social security numbers, addresses and/or the like. Accordingly, the textual data includes character combinations (i.e., strings) or patterns (e.g., regular expressions) that disclose portions of the confidential information 134.

The pattern information 120 also includes statistical data 132. In some embodiments, the statistical data 132 indicates frequencies for various character combinations including portions of the confidential information 134. For example, the statistical data 132 may include a frequency for a password prefix reflecting a likelihood that the password prefix can be found in everyday use. A low frequency denotes a strong probability that the computer user does not normally use the passwords prefix. The frequency may be compared with a metric for determining unique textual data.

In some embodiments, the indicia of detection 122 is produced on the user interface 114 and information the computer user as to a potentially accidental disclosure of the confidential information 134. For example, information warning the computer user may be presented via a message box. The indicia of detection 122 may also include a dialog box prompting the computer user for a decision regarding the potential disclosure. As another example, the indicia of detection 122 may include information indicating that the input data is being blocked and not presented through the visual representation object 112.

In some embodiments, the whitelist 138 includes identifiers associated with safe or approved application software (e.g., typing assistance programs, word processing programs and/or the like). If an identifier for the application software 116 matches any of the application software identifiers for the whitelist 138, communication of the input data 118 to the visual representation object 112 is permitted. The whitelist 138 may also include approved textual data that is permitted to be communicated even if such textual data includes unobscured portions of the confidential information 134. These whitelist 138 may be pre-defined or specified by the computer user.

In some embodiments, the metric 140 is a technique for determining effective textual data for detecting accidental disclosure of the confidential information 134. The metric 140 includes one or more pre-defined threshold values associated with effective character strings for identifying the confidential information 134 within the input data 118. For example, the metric 140 may indicate that character string having more than a particular number of characters is likely to be very effective in preventing the accidental disclosure. If a certain portion of the confidential information 134 is below the particular number of characters, then the certain portion is removed from the pattern information 122.

In some embodiments, the establishment module 124 includes software code (e.g., processor-executable instructions) that is stored in the memory 106 and executed by the CPU 102. The establishment module 124 generates the pattern information 120 by using the statistical data 132 to determine unique textual data. In some embodiments, the unique textual data includes portions of the confidential information 134 that are statistically improbable to be entered during normal computer usage. For example, the unique textual data may include password prefixes having character combinations that do not appear together often. As explained further below, the unique textual data is used to detect and prevent the accidental disclosure of the confidential information 134.

In some embodiments, the monitoring module 126 includes software code (e.g., processor-executable instructions) that is stored in the memory 106 and executed by the CPU 102. The monitoring module 126 may be a software procedure that hook or intercepts inputs from peripheral devices for the visual representation object 112. When the application software 116 instructs the operating system 108 to generate the visual representation object 112, the application software 116 also implements event handlers or attributes for processing the input data 118, such as keyboard inputs or keystrokes. After the input data 118 is received, the operating system 108 calls the monitoring module 126 and communicates the input data 118. The monitoring module 126 determines whether the input data 118 is obscured from public view or entered as clear text and therefore, visible to anyone. If the input data 118 is not obscured, the monitoring module 126 calls the comparison module 128 using the input data 118 as a parameter.

In some embodiments, the comparison module 128 includes software code (e.g., processor-executable instructions) that is stored in the memory 106 and executed by the CPU 102. The comparison module 128 examines the input data 118 and the pattern information 120 to identify unobscured portions of the confidential information 134. In some embodiments, the comparison module 128 identifies the passwords prefixes presented in clear text on the visual representation object 112.

In some embodiments, the production module 130 includes software code (e.g., processor-executable instructions) that is stored in the memory 106 and executed by the CPU 102. The production module 130 is configured to present the indicia of detection 122 to the computer user. In some embodiments, the production module 130 informs the computer user of the unobscured portions of the confidential information 134 and prompts the computer user for commands. If the computer user approves of the input data 118, the production module 130 instructs the operating system 108 to permit communication of the input data 118 to the visual representation object 112. If, on the other hand, the computer user does not approve of the input data 118, the production module 130 instructs the operating system 108 to block such a communication.

In some embodiments, the input data 118 may include characters entered by the computer user after the unobscured portions of the confidential information 134. The production module 130 may prevent characters subsequent to the unobscured portions from being displayed to the computer user as an alternative embodiment. For example, once the production module 130 identifies an unobscured password prefix within the input data 118, the operating system 108 is instructed to block the communication of any character entered after such a prefix to the visual representation object 112.

Figure 2:
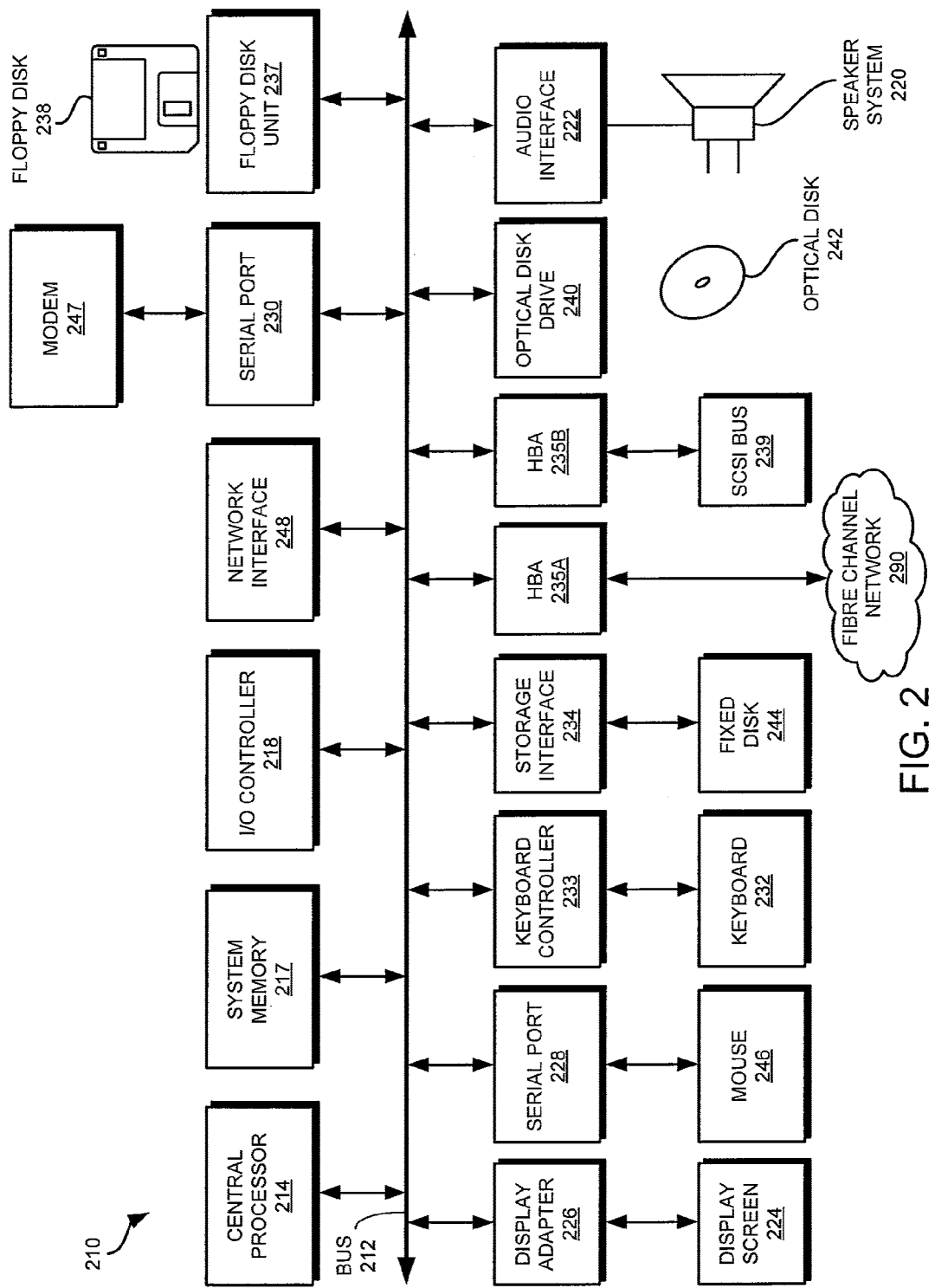
FIG. 2 is a block diagram of a suitable computer for implementing the present disclosure according to one or more embodiments.

FIG. 2 is a block diagram of a computer system 210 suitable for implementing the present disclosure. This system 210 is representative of a computer system that can be used to implement the attack computer 102 and/or the user computer 104 of FIG. 1. Computer system 210 includes a bus 212 which interconnects major subsystems of computer system 210, such as a central processor 214, a system memory 217 (typically RAM, but which may also include ROM, flash RAM, or the like), an input/output controller 218, an external audio device, such as a speaker system 220 via an audio output interface 222, an external device, such as a display screen 224 via display adapter 226, serial ports 228 and 230, a keyboard 232 (interfaced with a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included are a mouse 246 (or other point-and-click device, coupled to bus 212 via serial port 228), a modem 247 (coupled to bus 212 via serial port 230), and a network interface 248 (coupled directly to bus 212).

Bus 212 allows data communication between central processor 214 and system memory 217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral devices. Applications resident with computer system 210 are generally stored on and accessed via a computer readable medium, such as a hard disk drive (e.g., fixed disk 244), an optical drive (e.g., optical drive 240), a floppy disk unit 237, or other storage medium. Additionally, applications can be in the form of electronic signals modulated in accordance with the application and data communication technology when accessed via network modem 247 or interface 248.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG. 2 is readily known in the art and is not discussed in detail in this application. Code to implement the present disclosure can be stored in computer-readable storage media such as one or more of system memory 217, fixed disk 244, optical disk 242, or floppy disk 238. The operating system provided on computer system 210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
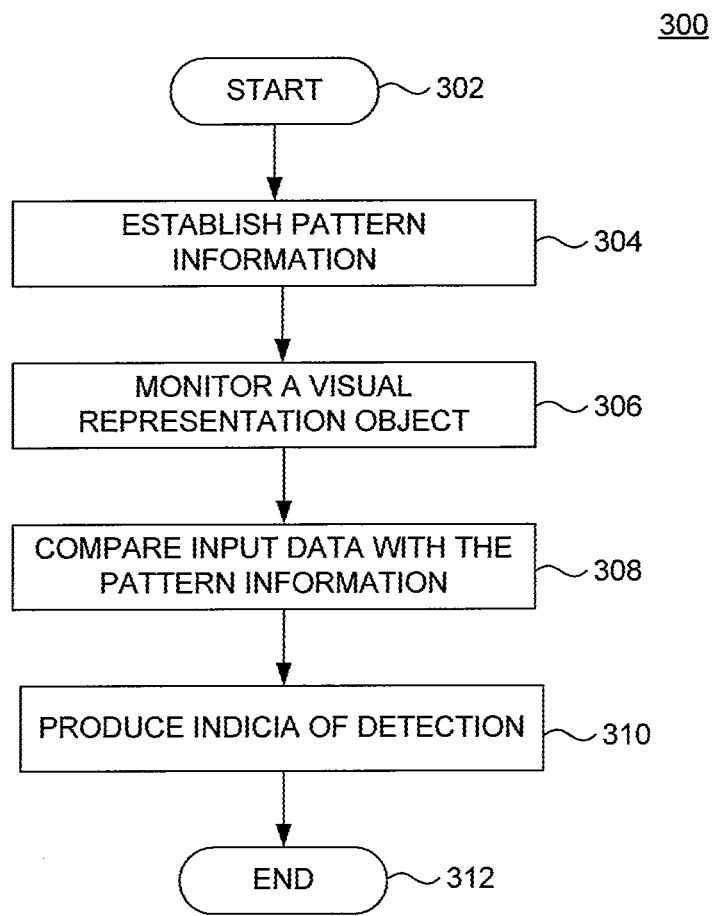
FIG. 3 is a flow diagram of a method for preventing accidental disclosure of confidential information via visual representation objects according to various embodiments of the present disclosure.

FIG. 3 is a flow diagram of a method 300 for preventing accidental disclosure of confidential information via visual representation objects according to various embodiments of the present disclosure. In some embodiments, the method 300 transforms confidential information (e.g., the confidential information 134 of FIG. 1) and input data (e.g., the input data 118 of FIG. 1) into indicia of detection (e.g., the indicia of detection 122 of FIG. 1) for such an accidental disclosure. The method 300 may be performed by various software modules as explained further below.

The method 300 starts at step 302 and proceeds to step 304. At step 304, pattern information (e.g., the pattern information 120 of FIG. 1) is established. In some embodiments, an establishment module (e.g., the establishment module 124 of FIG. 1) performs step 302 by determining unique textual data comprising portions of the confidential information. The unique textual data may include one or more character strings. The establishment module may use statistical data (e.g., the statistical data 132 of FIG. 1) to generate the character strings that identify the confidential information and are unlikely to be used during normal computer operation. In other words, it is statistically improbable that the computer user would enter these character strings as the input data. Therefore, when any of the character strings are entered, accidental confidential information disclosure most likely occurred through a visual representation object (e.g., the visual representation object 112 of FIG. 1).

At step 306, a visual representation object is monitored. Once an operating system instantiates the visual representation object (e.g., a computer window), the computer user employs peripheral devices, such as a keyboard, to input characters. A monitoring module processes keystrokes being communicated to the visual representation object. At step 308, the input data is compared with the pattern information. In some embodiments, the keystrokes are assembled into a character string that is compared with the unique textual data. Once a comparison module (e.g., the comparison module 128 of FIG. 1) determines that the character string is not obscured from public view, the comparison module examines the character string to identify portions of the confidential information.

At step 310, the indicia of detection is produced. In some embodiments, a production module (e.g., the production module 128 of FIG. 1) presents the indicia of detection to the computer user. For example, information warning the user of the unobscured portion of the confidential information. As another example, the production module uses a dialog box to prompt the computer user for commands. For example, the computer user may communicate commands as to whether to permit or block communication of the input data to the visual representation object. At step 312, the method 300 ends.

Figure 4:
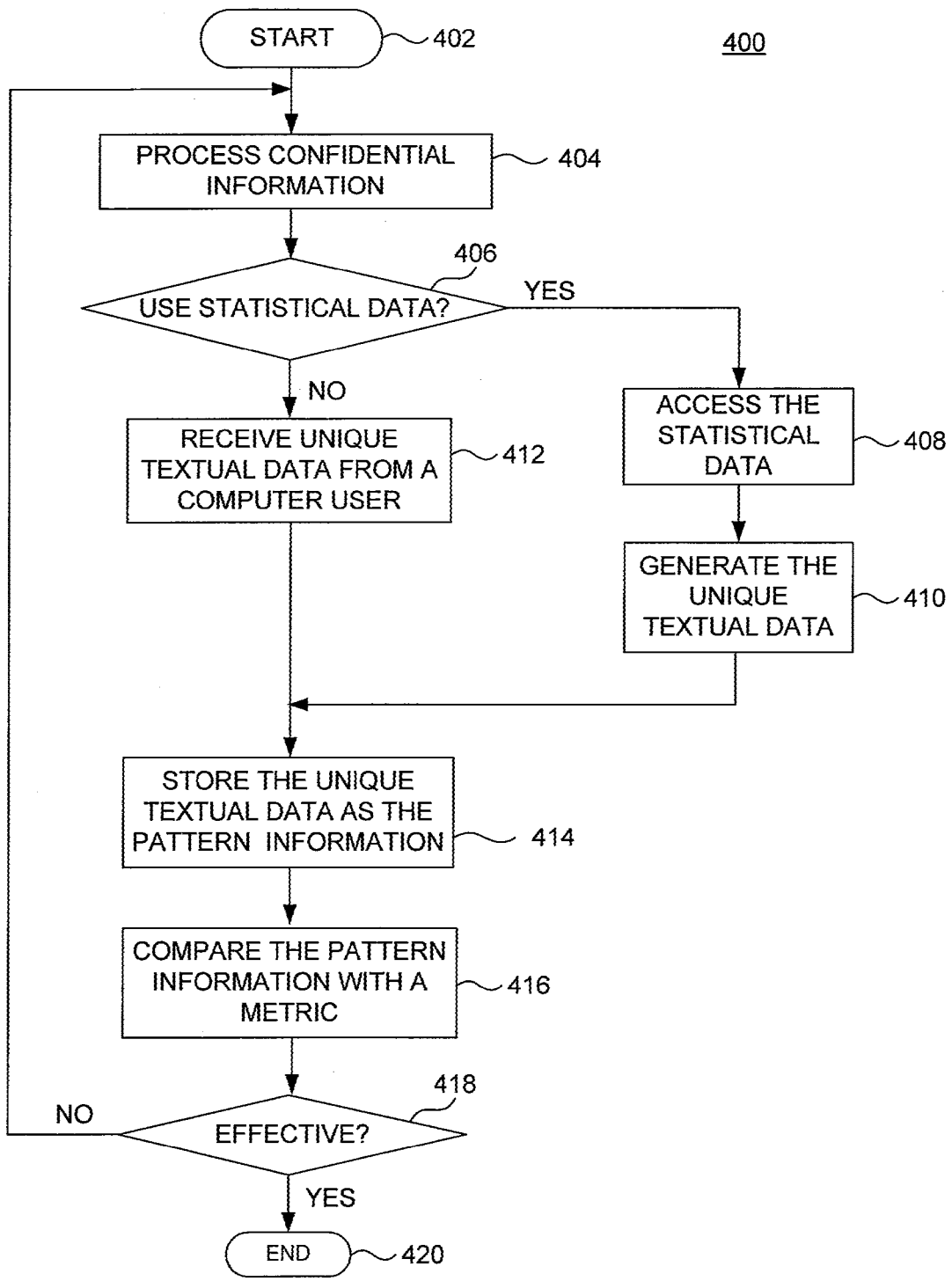
FIG. 4 is a flow diagram of a method for generating pattern information using statistical data according to various embodiments of the present disclosure.

FIG. 4 is a flow diagram of a method for generating pattern information using statistical data according to various embodiments of the present disclosure. An establishment module (e.g., the establishment module 124 of FIG. 1) may perform each and every step of the method 400 as explained below.

The method 400 starts at step 402 and proceeds to step 404. At step 404, confidential information (e.g., the confidential information 134 of FIG. 1) is processed. The establishment module accesses passwords, credit card numbers and/or other sensitive data as explained in the present disclosure. At step 406, a determination is made as to whether statistical data is to be utilized for generating unique textual data. If the statistical data is to be utilized, the method 400 proceeds to step 408. At step 408, the statistical data (e.g., the statistical data 132 of FIG. 1) is accessed. The statistical data may include probabilities associated with portions (e.g., character strings) of the confidential information. At step 410, the unique textual data is generated. After the step 410, the method 400 proceeds to step 414.

If, on the other hand, the statistical data is not to be utilized, the method 400 proceeds to step 412. At step 412, the unique textual data is received from the computer user. In some embodiments, the establishment module produces a dialog box and prompts the computer user for unique portions of the confidential information. For example, the computer user may enter password prefixes. At step 414, the unique textual data is stored as the pattern information.

At step 416, the pattern information is compared with a metric (e.g., the metric 140 of FIG. 1) for determining effective character strings for detecting the accidental confidential information disclosure. At step 418, a determination is made as to whether the unique textual data is effective in identifying the unobscured portions of the confidential information. If it is determined that the unique textual data is not effective based on the metric, the method 400 returns to step 404. If, on the other hand, the unique textual data is determined to be effective in identifying the unobscured portions, the method 400 proceeds to step 420. At step 420, the method 400 ends.

Figure 5A:
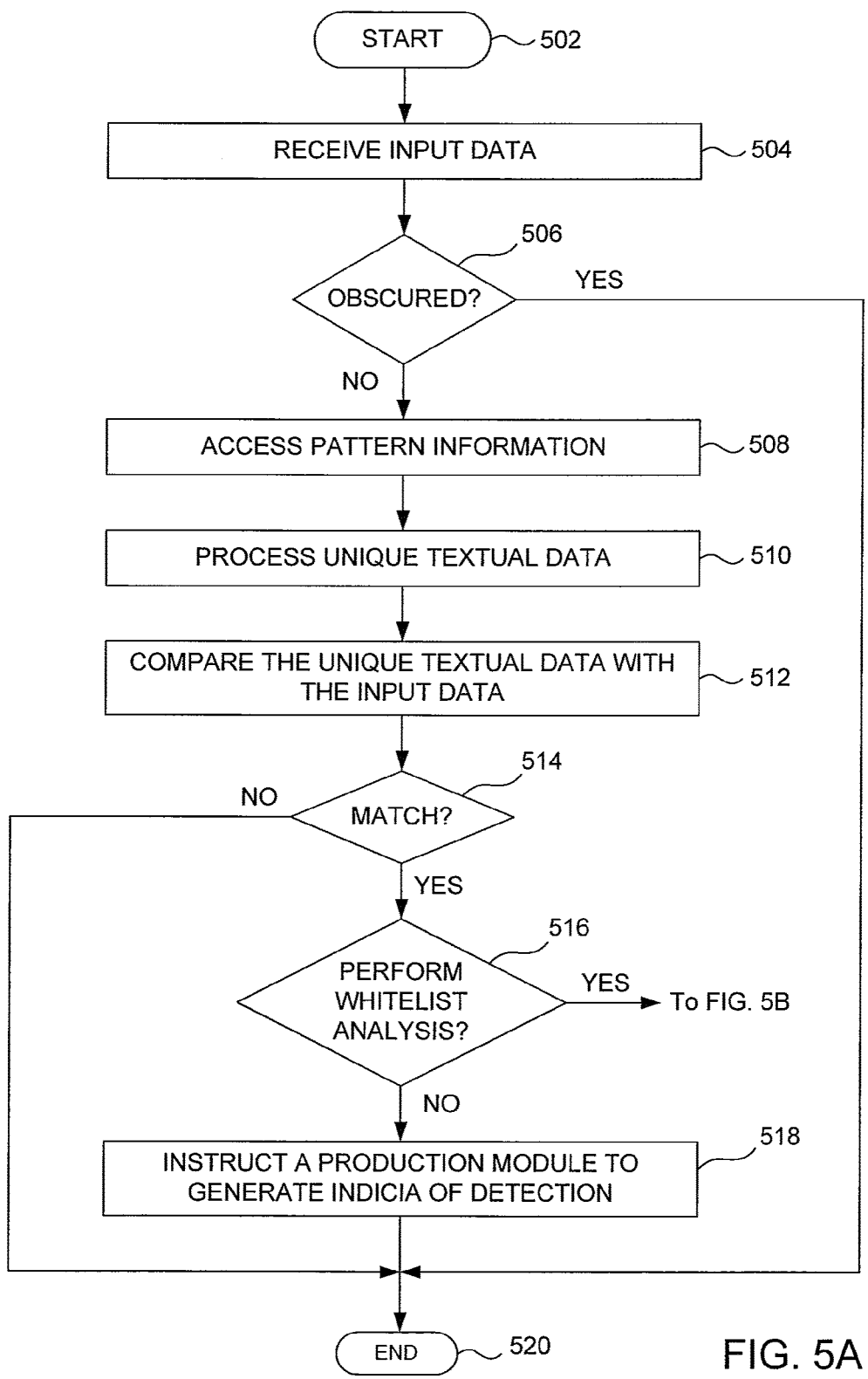
FIGS. 5A-B depict a flow diagram of a method for comparing the pattern information with input data according to various embodiments of the present disclosure.
Figure 5B:
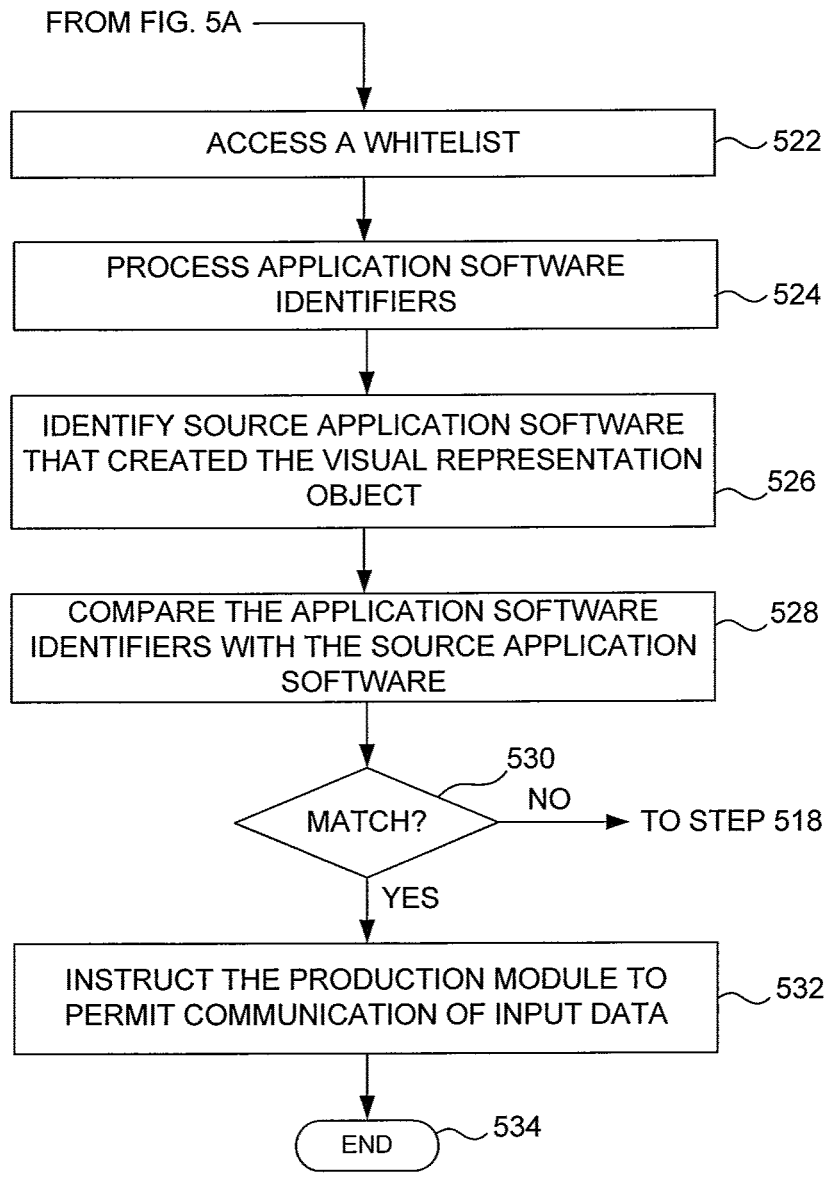

FIGS. 5A-B illustrate a flow diagram of a method 500 for comparing the pattern information with input data according to various embodiments of the present disclosure. A comparison module (e.g., the comparison module 128 of FIG. 1) may perform each and every step of the method 500 as explained further below.

The method 500 starts at step 502 and proceeds to step 504. At step 504, input data is received. At step 506, a determination is made as to whether the input data is presented to the computer user as obscured text. If the input data is obscured, the method 500 proceeds to step 520. If, on the other hand, the input data is not obscured, the method 500 proceeds to step 508. In some embodiments, the comparison module examines various visual representation object attributes for presenting the input data on a user interface. If a certain attribute is configured, software code (e.g., a keystroke event handler) is executed and the input data is modified and represented as a character string. Such a character string, in one embodiment, may include only one particular character (e.g., an asterix). For example, if the input data is entered into a password field of a password control, the input data is obscured from public view. If, however, the input data is entered into the user name field, then the input data is presented in clear text and disclosed to the public.

At step 508, pattern information is accessed. At step 510, unique textual data is processed. At step 512, the unique textual data is compared with the input data. At step 514, a determination is made as to whether the input data matches any portion of confidential information. If it is determined that the input data matches a unique portion of the confidential information, the method 500 proceeds step 516. If, on the other hand, the input data does not include confidential information, then the method 500 proceeds to step 520. At step 516, a determination is made as to whether to perform a whitelist analysis on the matching portions of the confidential information. If the whitelist analysis is not to be performed, the method 500 proceeds to step 518. At step 518, a production module is instructed to generate indicia of detection as to the unobscured portions of the confidential information. At step 520, the method 500 ends.

If, on the other hand, the whitelist analysis is to be performed, the method 500 proceeds to step 522. Steps 522 to 534 are illustrated on FIG. 5B. At step 522, a whitelist is accessed. At step 524, application software identifiers are processed. At step 526, source application software (e.g., the application software 116 of FIG. 1) that created the visual representation object is identified. At step 528, the source application software is compared with the application software identifiers. At step 530, a determination is made as to whether the source application software matches any of the application software identifiers. If there is a matching identifier, the method 500 returns to step 518. If, on the other hand, none of the application software identifiers match the source application software, then the method 500 proceeds to step 532. At step 532, the production module is instructed to permit communication of the input data to the visual representation object. At step 534, the method 500 ends.

Figure 6:
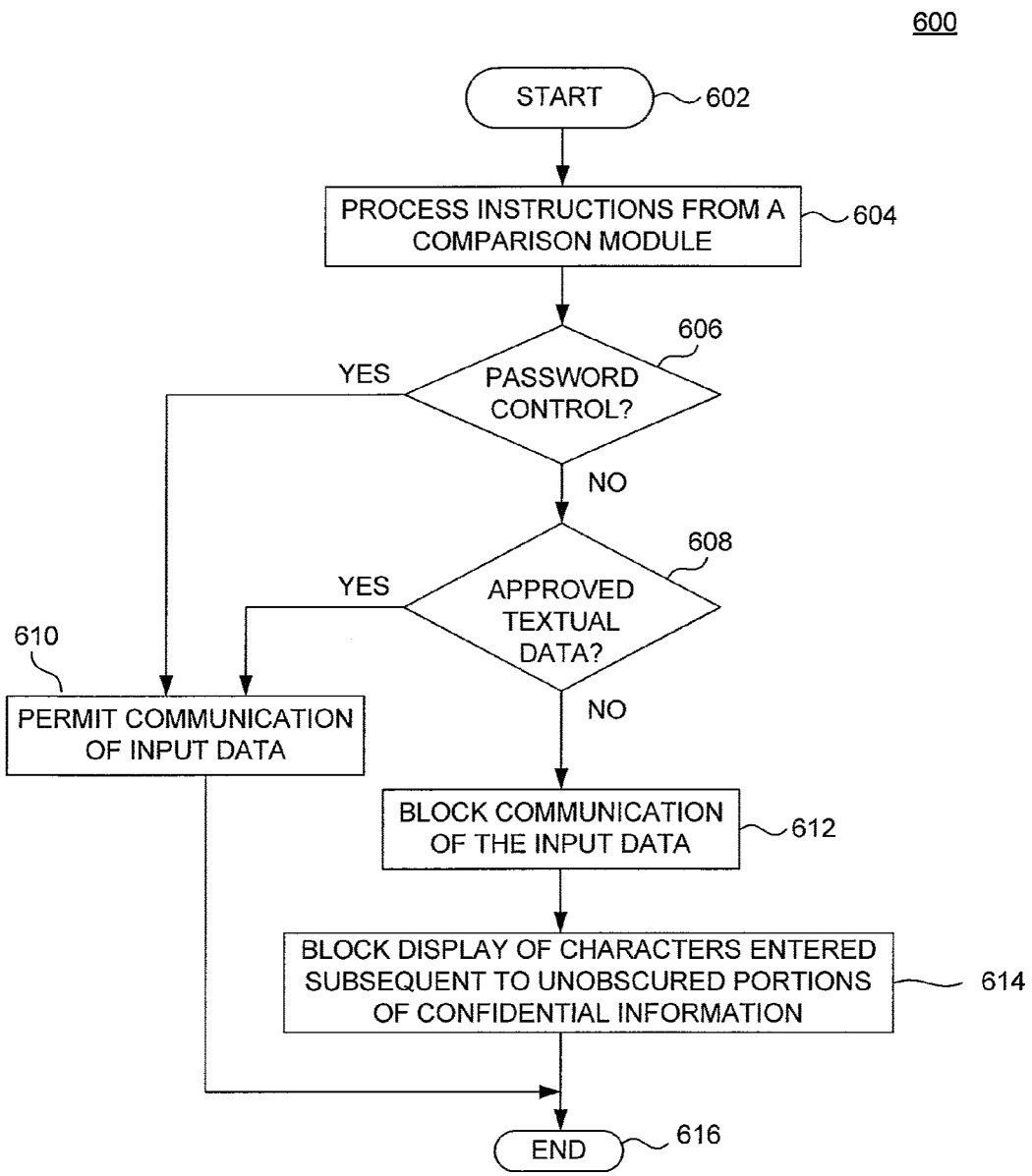
FIG. 6 is a flow diagram of a method for producing indicia of detection of one or more unobscured portions of confidential information according to various embodiments of the present disclosure.

FIG. 6 is a flow diagram of a method 600 for producing indicia of detection as to one or more unobscured portions of confidential information according to various embodiments of the present disclosure. In some embodiments, a production module (e.g., the production module 130 of FIG. 1) performs each and every step of the method 600 as explained further below.

The method 600 starts at step 602 and proceeds to step 604. At step 604, instructions are processed. In some embodiments, a comparison module (e.g., the comparison module 128 of FIG. 1) communicates such instructions to the production module for the purpose of presenting the indicia of detection (e.g., the indicia of detection 122 of FIG. 1) to a computer user. In some embodiments, the comparison module instructs the production module to permit communication of the input data if visual representation object (e.g., the visual representation object 112 of FIG. 1) is a password control.

At step 606, a determination is made as to whether the visual representation object is the password control. If the password control is on a user interface (e.g., the user interface 114 of FIG. 1), the method 600 proceeds to step 610. If, on the other hand, the password control is on a user interface, the method 600 proceeds to step 608. At step 608, a determination is made as to whether the input data includes approved textual data. In some embodiments, the production module presents information warning the computer user of a possible confidential information disclosure.

The production module may also present a dialog box requesting a decision as to the possible disclosure. In one embodiment, the computer user may determine that the input data is safe and select an option for permitting the communication of the input data. In another embodiment, the computer user may determine that the input data is an accidental confidential information disclosure and select an option of blocking the communication. Alternatively, the production module may determine that input data matches a whitelisted character string and then, proceed to permit the disclosure as explained further below.

At step 610, communication of the input data to the visual representation object is permitted. In some embodiments, the production module instructs an operating system to set a property associated with the visual representation object for making the input data visible on a user interface (e.g., the user interface 114 of FIG. 1). In an alternative embodiment, the production module determines that portions of the input data match the unique texual data and do not constitute the approved textual data. Since the input data includes unobscured portions of the confidential information, the production module automatically blocks the input data from being displayed to the computer user.

At step 612, the communication of the input data to the visual representation object is blocked. In one embodiment, the production module instructs the operating system to configure a property such that the input data is not presented to the computer user. At step 614, the display of characters entered subsequent to the unobscured portions of the confidential information is prevented. Because the input data may include characters of which the computer user entered subsequent to the matching unique textual data, such as a password prefix, the communication to the visual representation object of these characters is also blocked by the production module according to some embodiments. The production module, as a result, prevents the display of the subsequent characters to the computer user. At step 616, the method 600 ends.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

The invention claimed is:

1. A method of preventing accidental disclosure of confidential information via visual representation objects, comprising:
    establishing pattern information with respect to confidential information, wherein the confidential information is used to authenticate users;
    monitoring a visual representation object having an input focus associated with a user interface, wherein the visual representation object receives input data;
    determining whether display of the input data on the visual representation object is obscured;
    comparing, via at least one computer processor, the input data with the pattern information to identify at least one unobscured portion of the confidential information when it is determined that the display of the input data is not obscured; and
    producing and displaying indicia of detection of the at least one unobscured portion of the confidential information on the visual representation object based on the comparison, the display of the indicia of detection being different from the display of the input data,
    wherein comparing the pattern information with the input data further comprises comparing the identified at least one unobscured portion with a whitelist, and
    wherein the whitelist comprises approved textual data for the visual representation object.

2. The method of claim 1, wherein the establishing the pattern information further comprises determining unique textual data based on statistical data for the confidential information, wherein the unique textual data comprises various portions of the confidential information.

3. The method of claim 1, further comprising:
    transforming the pattern information and the input data into the indicia of detection.

4. The method of claim 1, wherein the establishing the pattern information further comprises comparing the pattern information with a metric for determining effective character strings for identifying the confidential information.

5. The method of claim 1, wherein producing the indicia of detection further comprises blocking communication of the input data to the visual representation object.

6. The method of claim 1, wherein producing the indicia of detection further comprises blocking display of characters entered subsequent to the unobscured portions of the confidential information.

7. The method of claim 6, wherein the unobscured portions of the confidential information comprise a password prefix.

8. The method of claim 1, wherein producing the indicia of detection further comprises permitting communication of the input data when the visual representation object comprises a password control.

9. The method of claim 1, wherein comparing the pattern information with the input data further comprises examining application software that created the visual representation object with a second whitelist.

10. An apparatus for preventing accidental disclosure of confidential information via visual representation objects, comprising:
    an establishment module to generate pattern information with respect to confidential information, wherein the confidential information is used to authenticate users;
    a monitoring module to access a visual representation object having an input focus associated with a user interface, wherein the visual representation object receives input data and is displayed on a display unit;
    a determination module to determine whether display of the input data on the visual representation object is obscured;
    a comparison module, executing in conjunction with at least one memory and computer processor, to examine the input data and the pattern information to identify at least one unobscured portion of the confidential information when it is determined that the display of the input data is not obscured; and
    a production module that produces and displays indicia of detection of the at least one unobscured portion of the confidential information on the visual representation object based on the comparison, the display of the indicia of detection being different from the display of the input data,
    wherein the comparison module compares the identified at least one unobscured portion with a whitelist, and
    wherein the whitelist comprises approved textual data for the visual representation object.

11. The apparatus of claim 10, wherein the establishment module determines unique textual data based on statistical data for the confidential information, wherein the unique textual data comprises various portions of the confidential information.

12. The apparatus of claim 10, wherein the production module blocks communication of the input data to the visual representation object.

13. The apparatus of claim 10, wherein the production module permits communication of the input data when the visual representation object comprises a password control.

14. The apparatus of claim 10, wherein the comparison module examines application software that created the visual representation object with a second whitelist.

15. At least one non-transitory computer-readable-storage medium comprising one or more processor-executable instructions that, when executed by at least one processor, causes the at least one processor to:
- establish pattern information with respect to confidential information, wherein the confidential information is used to authenticate users;
- monitor a visual representation object having an input focus associated with a user interface, wherein the visual representation object receives input data;
- determine whether display of the input data on the visual representation object is obscured;
- compare the input data with the pattern information to identify at least one unobscured portion of the confidential information when it is determined that the display of the input data is not obscured; and
- produce and display indicia of detection of the at least one unobscured portion of the confidential information on the visual representation object based on the comparison, the display of the indicia of detection being different from the display of the input data,
- wherein comparing the pattern information with the input data further comprises comparing the identified at least one unobscured portion with a whitelist, and
- wherein the whitelist comprises approved textual data for the visual representation object.

16. The at least one non-transitory computer-readable-storage medium of claim 15,
- wherein the one or more processor-executable instructions further cause the at least one processor to:
  - block communication of the input data to the visual representation object.

17. The at least one non-transitory computer-readable-storage medium of claim 15,
- wherein the one or more processor-executable instructions further cause the at least one processor to:
  - permit communication of the input data when the visual representation object comprises a password control.

18. The at least one non-transitory computer-readable-storage medium of claim 15,
- wherein the one or more processor-executable instructions further cause the at least one processor to:
  - examine application software that created the visual representation object with a second whitelist.

* * * * *